United States Patent [19]

Blount

[11] 4,087,407

[45] May 2, 1978

[54] PROCESS FOR THE PRODUCTION OF EPOXY SILICATE FOAM

[76] Inventor: David H. Blount, 5450 Lea St., San Diego, Calif. 92105

[21] Appl. No.: 821,584

[22] Filed: Aug. 4, 1977

Related U.S. Application Data

[63] Continuation-in-part of Ser. No. 678,196, Apr. 19, 1976, Pat. No. 4,036,787.

[51] Int. Cl.$^2$ .................... C08G 77/04; C07F 7/08; C07F 7/10
[52] U.S. Cl. .................... 260/46.5 R; 260/46.5 E; 260/448.2 R; 260/448.2 E; 260/448.2 N; 260/448.8 R; 260/448.2 B; 260/46.5 Y

[58] Field of Search ............. 260/448.8 R, 46.5 E, 260/448.2 N, 46.5 R, 448.2 E, 448.2 R, 448.2 B, 46.5 Y

[56] References Cited

U.S. PATENT DOCUMENTS 3,986,997  10/1976  Clark .................... 26/448.2 E X

*Primary Examiner*—Paul F. Shaver

[57] ABSTRACT

Inorganic oxidated silicon compounds will react chemically with an amine and an epoxy compound to produce an epoxy silicate prepolymer that will produce a self-standing foam upon heating.

24 Claims, No Drawings

PROCESS FOR THE PRODUCTION OF EPOXY SILICATE FOAM

CROSS-REFERENCE TO RELATED APPLICATIONS

This application is a continuation-in-part of my earlier U.S. patent application No. 678,196 filed Apr. 19, 1976 now Pat. No. 4,036,787 issued July 19, 1977.

BACKGROUND OF THE INVENTION

This invention relates to the production of epoxy silicate foams by the chemical reaction of an inorganic oxidated silicon compound with an organic amine compound and an epoxy compound. The product produced by this invention will be referred to as epoxy silicate foam for the purpose of this application.

Various inorganic silicates and related oxidated silicon compounds such as silicoformic acid, hydrated silica, and silicates containing free silicic acid groups may be used in this invention. It is preferred that the inorganic silicates, silicon dioxide, silica, hydrated silica, and mixtures thereof be in the form of a fine granular or powdered compound.

The silicoformic acid may be produced by the methods of U.S. Pat. Nos. 3,956,466, 3,993,737, and 3,962,111.

The silica ($SiO_2$) and hydrated silica ($SiO_2.H_2O$) may be produced by any of the commonly known methods. Hydrated silica may be produced by reacting an acid with an aqueous solution of sodium silicate, thereby producing a silicic gel which is then dried thereby forming a hydrated silica.

Any suitable inorganic silicate may be used in this process. Silicates, containing free silicic acid groups are preferred. Many of the common silicates may be used in this process such as clay, talc, alkali metal silicates, alkaline earth metal silicates, zeolite, magnesium silicate, diatomaceous earth, soapstone, tremoline, feldspar, kaolin and other silicates.

The epoxy silicate foam may be produced as rigid foams, semirigid foams, soft foams, and rubbery soft foams. The foams may be expanded from 3 to 10 times the original liquid volume. The epoxy silicate foams have a number of diverse applications. They may be molded into useful foam objects. They may be foamed in place. They may be used for insulation, floatation, strengthening material and packaging material. The epoxy silicate foams may be produced in the form of a soft foam which can be used as a packaging material to protect fragile objects and is biodegradable. It disintegrates when it becomes wet unless modified by additives.

SUMMARY OF THE INVENTION

I have discovered that oxidized silicon compounds such as silicon dioxide, silicoformic acid, hydrated silica, silica, inorganic silicates, and mixtures thereof, when mixed in appropriate proportions with a suitable epoxy compound and a suitable catalyst, will react chemically to produce an epoxy silicate prepolymer, and when heated or an appropriate catalyst added, will produce a self-standing foam. The proportions of the oxidized silicon compounds, amine catalyst and epoxy compounds may be varied, for example, to produce a foam ranging from a soft rubbery foam, to a soft foam, to a semi-rigid foam and to a rigid foam.

The reactants may be mixed in any suitable proportions, depending upon the product characteristics desired. Generally, from about 0.5 to 5 parts by weight of oxidized silicon compounds and from 1 to 3 parts by weight of an amine compound are mixed with 3 to 5 parts by weight of an epoxy compound.

The preferred process of this invention is to mix the fine granular oxidized silicon compound with an organic diamine and then slowly add the epoxy compound while agitating and keeping the temperature below 70° C until a prepolymer is produced. When it desirable, then the epoxy silicate prepolymer may be heated to 80° to 100° C while agitating for a few minutes until the foaming process starts. The prepolymer expands to 3 to 10 times its liquid volume and produced a free standing foam. To improve properties of the foam, it may be heated at 100° to 150° C for 1 to 2 hours.

The reactions of this invention may take place under any suitable physical condition. While many of the reactions will take place acceptably at ambient temperature and pressures, in some cases, better results may be obtained at somewhat elevated temperatures and pressures. Preferable, the reaction takes place at a temperature between 25° and 100° C. On the other hand, where the reaction is exothermic, it may be desireable to cool the reaction vessel. With some products it is desirable to heat the foam at 100° to 150° C for 1 to 2 hours.

The exact course of the reactions which take place during the process to produce epoxy silicate foams cannot be determined with 100% certainty. The exact chemical formulae for the epoxy silicate foams are not known.

Any suitable epoxy compound may be used in this process. Typical epoxy compounds include epichlorohydrin, glycidol, methyl epichlorohydrin, 1,2-epoxybutane, 1,2-epoxycyclohexane, epoxyethane, 1,2-epoxypropane, 1-chloro-2,3-epoxypropane, 1:2,3:4-diepoxybutane, 2:3,6:7-diepoxy-2,6-dimethyl-4-octene, epoxyethylbenzene and mixtures thereof. Of these, best results are obtained with epichlorohydrin which is, therefore, the preferred epoxy compound.

Any suitable epoxidized polyhydroxy compounds may be used in this process. The epoxides of polyhydroxy compounds are produced by chemically reacting a peroxy acid such as peroxyacetic acid, peroxybenzoic acid and peroxyacid which are produced by oxidizing organic aldehydes.

Any suitable epoxidized oils may be used in this process. The epoxidized oils are produced by chemically reacting peroxy acids with unsaturated vegetable oil such as castor oil.

Any suitable epoxidized unsaturated organic compounds may be used in this process. The epoxidized unsaturated organic compounds are produced by the chemical reaction of diolefin or polyolefin compounds with peroxy acid compounds to produce epoxy compounds by epoxidation.

Any suitable epoxidized polyhydroxy compounds produced by the chemical reaction of epichlorohydrin with a polyhydroxy compound may be used in this process.

Any suitable epoxidized unsaturated fatty acid may be used in this process. The unsaturated fatty acids may be chemically reacted with epichlorohydrin or a peroxy acid compound to produce the epoxidized unsaturated fatty acid.

Best results are obtained when the epoxidized unsaturated organic compounds, epoxidized polyhydroxy compounds, epoxidized fatty acid, phenoxy resins and epoxidized vegetable oils are used with epichlorohydrin in the production of epoxy silicate foams. The ratio of the parts by weight of epoxidized compounds to the parts by weight of epichlorohydrin may be quite varied, ranging from 2 to 1 up to 1 to 2. The epoxidized compounds or resins should have 2 or more reactive epoxy groups per molecule for the purpose of this invention.

Any of the epoxy resins may be used which contain 2 or more reactive epoxy groups per molecule such as that produced by reacting epichlorohydrin with bisphenol A and diglycidyl ether of bisphenol. The epoxy resins with 2 or more reactive epoxy groups per molecule are obtained by condensing epichlorohydrin with a suitable dihydroxy organic compound. Best results are obtained when using bisphenol A [2,2-(4-bis-hydroxyphenyl)-propane] and this is considered to be the preferred hydroxy compound. Other hydroxy containing compounds such as resorcinol, hydroquinone glycols, glycerol and mixtures thereof may be used in mixture with or in lieu of the hydroxy alkanes if desired. Any suitable di(mono-hydroxy) alkane may be chemically reacted with epichlorohydrin and used in this invention. Typical di(mino-hydroxy) alkanes are: (4,4'-dihydroxy-diphenyl-methane; 2,2-(4 bis-hydroxy phenyl)-propane; 1,1-(4,4'-dihydroxy-diphenyl)cyclohexane; 1,1(4,4'-dihydroxy-3,3'-dimethyl-diphenol)-butane; 2,2-(2,2-dihydroxy-4,4'-di-tert-butyldiphenyl)-propane; 2,2-(4,4'-dihydroxy-diphenyl)butane; 2,2-(4,4'-dihydroxy-diphenyl)pentane; 3,3-(4,4'-dihydroxy-diphenyl) pentane; 2,2-(4,4'-dihydroxy-diphenyl)hexane; 3,3-(4,4'-dihydroxydiphenyl)hexane; 2,2-(4,4'-dihydroxy-diphenyl)-4-methyl-pentane; (dihydroxy-diphenyl)-heptane; 4,4'-(4,4'-dihydroxy-diphenyl)-heptane; 2,2-(4,4'-dihydroxy-diphenyl)-tri decane; 2,2-(4,4'-dihydroxy-3'methyl-diphenyl)-propane; 2,2-(4,4'-dihydroxy-3-methyl-3'-isopropyldiphenyl)butane; 2,2-(3,5,3',5'-tetrachloro-4,4'-dihydroxy-diphenyl) propane; 2,2-(3,5,3',5'-tetrabromo-4,4'-dihydroxy-diphenyl)propane; (3,3'-dichloro-4,4'-dihydroxy-diphenyl)-methane; (2,2'-dihydroxy-5,5'-difluoro-diphenyl)methane; (4,4'-dihydroxy-diphenyl)-phenyl-methane; 1,1'-4,4'-dihydroxy-diphenyl-1-phenyl-ethane and 1,1'-(4,4'-dihydroxy-diphenyl)-1-phenyl-ethane.

Any suitable catalyst may be used to initiate, promote, or modify the chemical reaction. Typical catalysts include various mineral acids, Lewis acids and organic amine compounds. Organic amines have been found to both act as a catalyst and enter into the reaction and become part of the epoxy silicate foam. Aliphatic and aromatic amines have been found to be most useful. Primary amines are more effective than secondary and tertiary amines and are, therefore, perferred. Optimum results have been obtained with polyfunctional aliphatic amines such as diethylenetriamine, since the reaction takes place rapidly at room temperature to form apparently highly cross-linked structures. If desired, complex or adduct amines may be used. Typical amines include methylamine, ethylamine, propylamine, isopropylamine, butylamine, amylamine, hexylamine, aniline, toluidine amine, xylidine amine, phenylenediamine, naphthylamine benzylamine, ethylenediamine, tetramethylenediamine, pentamethylenediamine, hexamethylenediamine, octamethylenediamine, decamethylenediamine, xylylenediamine, piperazine, diethylenetriamine, triethylenetetramine, tetraethylenepentamine, and mixtures thereof. The polyamine catalyst may first be reacted with dicarboxyl acids, dicarboxyl anhydrides, epoxy compounds and carbon disulfide to produce polyamine compounds with unreacted amine groups.

Any suitable modifying or additive compounds may be used in the reaction of this invention to vary properties of the product. Typical additives include, dicarboxylic anhydrides, dicarboxylic acids, di and polyhydroxy compounds, polysulfide polymers, alkali sulfides, sodium polysulfide, aminoplasts, phenoplasts, fatty or rosin acids, furfural-ketone resins, aldehydes, ketones, dibutyl phthalate, tricresyl phosphate, polyamides, fatty acid diamines, styrene oxides, acetonitrile, primary sulfonamides, secondary aromatic sulfonamides, disecondary sulfonamides, polymerized oils, carbon disulfide, soya bean oil, polyamide resins, wood flour, wood fibers, cellulose, lignin, cellulose derivitives, polyester polymers, polyether polymers, poly(acrylic acid)-polymers, vegetable oils, melamine furan compounds vinyl monomers and polymers, phenols, allyl alcohol, allyl chloride alkali metal cyanides, urethane polymers, isocyanides, diisocyanides, polyisocyanides, thioplasts, furan resins, alginic acid, aliphatic dienes, halogenated aliphatic and aromatic compounds, sulfur, Thiokol polymers, triallyl cyanurate, heterocyclic vinyl compounds and polymers, diethyl oxalate, diallyl phthalate, sulphonated castor oil, paraffin oil, and mixtures thereof.

The amount of modifying or additive compounds and resins may be varied greatly from a small amount to up to equal weight of the epoxy silicate prepolymer. The modifying or additive compounds and resins may be added in the first step in the production of epoxy silicate prepolymers or added after the epoxy silicate prepolymers have been produced but before the foaming begins.

The epoxy silicate foams may be modified by adding an alkali compound to react with epoxy compounds containing a halide, to improve the strength and decrease the hydroscopic properties. The foam becomes more elastic and does not tear as easily. The alkali compound is added in the ratio of about 0.5 to 1 mol per mol of the epoxy compound containing a halide. The alkali compounds include sodium hydroxide, potassium hydroxide, sodium oxide, potassium oxide, sodium silicate, sodium polysulfide, sodium carbonate, potassium carbonate, sodium cyanide, soda lime, calcium hydroxide, alkali metal salts of weak dicarboxyl acids, alkali metal phenols, alkali metal polyhydroxy aliphatic and aromatic compounds, alkali metal salts of poly(acrylic acid) polymer, alkali metal salts of poly(methacrylic acid) polymers, ammonia, ammonia salts of weak acids and mixtures thereof.

Additives may be added to emulsify the mixture, to modify the cells in the foam, to regulate the foaming and to stabilize the foam. The mixture may be emulsified with alkali soaps, metalic soaps such as zinc stearate and calcium stearates and detergents. The cells in the foam may be modified, regulated and stabilized by the addition of additives such as metallic powders, ethyl cellulose, chlorinated natural rubber, polyvinyl acetate, polyvinyl chlorides, metallic salts, alkylated phenoxy polyethoxy ethanol, sodium dioctyl sulfosuccinate dioctyl calcium sulfosuccinate, dioctyl sulfosuccinate, methyl morpholine, diethylethanolamine, dimethyl ethanol amine, manganous chloride and mixtures thereof.

Any suitable isocyanate may be used to improve the epoxy silicate foam such as toluene-2,4-diisocyanate, toluene-2,6-diisocyanate, diphenylmethane-2,4- diisocyanate, meta-phenylene, diisocyanate, triphenylmethane triisocyanate, hexamethylene diisocyanate, dichloroxenylene diisocyanate, naphthalene-1,5-diisocyanate, diphenyl sulfone-1,4-diisocyanate, 2-nitrodiphenyl-4,4'diisocyanate, fluorene diisocyanate, 3,3'-dimethyldiphenylmethane-4,4'-diisocyanate, and mixtures thereof.

The primary object of the present invention is to produce epoxy silicate foams. Another object is to produce epoxy silicate foams that may be used as an insulation material. Another object is to produce epoxy silicate prepolymers that can be heated in a mold and produce a foam that may be used to protect fragile objects when shipped, and then, when thrown away, will disintegrate.

DESCRIPTION OF PREFERRED EMBODIMENTS

My invention will be illustrated in greater detail in the specific examples which follow, which detail the preferred embodiments of my process. It should be understood that the scope of my invention is not limited to the specific processes set out in the examples. Parts and percentages are by weight, unless otherwise indicated.

EXAMPLE I

About 4 parts by weight of fine granular silica and 2 parts by weight of diethylenetriamine are mixed, then 3 parts by weight of epichlorohydrin are slowly added while agitating at ambient pressure and keeping the temperature between ambient temperature and 70° C for 10 to 20 minutes until a thick, gray-colored liquid is produced, containing epoxy silicate prepolymer and silica. The temperature is then elevated to 80° C to 100° C and foaming begins. It expands to about 8 to 10 times the original volume to produce a semi-rigid foam. The light gray to cream-colored foam becomes soft when cooled.

The foam has good rebounce properties when compressed. It has poor tear resistant properties and deteriorates when wet. The foam is useful in protecting fragile articles in packages. The foam is bio-degradable; it has good insulation properties.

EXAMPLE II

About 2 parts by weight of diethylenetriamine are slowly mixed with 3 parts by weight of epichlorohydrin while keeping the temperature between ambient temperature and 70° C. The chemical reaction is complete in 10 to 20 minutes. The mixture is stable over a long period of time, unless the temperature is elevated above about 80° C.

About equal parts by weight of a fine granular silica ($SiO_2.xH_2O$) and said mixture are mixed then heated to 80° to 100° C while agitating at ambient pressure. When the temperature of the mixture reaches about 80° C it begins to foam and expands to about 8 to 10 times its original volume, thereby producing a soft, cream colored, epoxy silicate foam.

(a) About equal parts by weight of a fine granular hydrated silica and said mixture of reacted epichlorohydrin and diethylenetriamine are mixed then heated while agitating under ambient pressure, and as the temperature reaches between 80° to 100° C the mixture begins to foam and expands to 8 to 10 times its original volume, thereby producing a light gray-colored, soft, epoxy silicate foam.

(b) About equal parts by weight of a fine granular silicate compound (talc) and said mixture of chemically reacted epichlorohydrin and diethylenetriamine are mixed then heated while agitating under ambient pressure, and when the temperature reaches 80° to 100° C the mixture begins to foam and expands to 8 to 10 times its original volume, thereby producing a cream colored, soft, epoxy silicate foam.

(c) About 2 parts by weight of a granular sodium metasilicate pentahydrate and about 5 parts by weight of said mixture of chemically reacted diethylenetriamine epichlorohydrin are mixed then heated while agitating at ambient pressure, and when the temperature reaches 80° to 100° C the mixture begins to foam and expands to 3 to 8 times its original volume, thereby producing a white, soft, rubbery, epoxy silicate foam. The epoxy silicate foam is then heated in an oven at 100° to 120° C for 1 to 2 hours.

EXAMPLE III

About 2 parts by weight of diethylenetriamine and 3 parts by weight of epichlorohydrin are slowly mixed over a period of 10 to 20 minutes while agitating and keeping the temperature below 70° C until the mixture becomes thick. The exothermic reaction elevates the temperature to between 80° to 100° C, and the mixture begins to foam, thereby expanding to 6 to 8 times its original volume, but, as it begins to cool, the foam shrinks to about 2 to 3 times its original volume, thereby producing a light yellow, brittle, epoxy foam.

EXAMPLE IV 2 parts by weight of ethylenediamine, 1 part by weight of sodium carbonate, and 6 parts by weight of epichlorohydrin are slowly mixed, thereby producing a light yellow resinous product. The resinous product is heated to 80° to 100° C for several minutes but does not foam. About 4 parts by weight of fine granular silica are mixed with the resinous product then heated while agitating, and when the temperature reaches 80° to 100° C the mixture expands into a foam of about 6 to 8 times its original volume, thereby producing a cream colored, soft, epoxy silicate foam.

EXAMPLE V

About 2 parts by weight of fine granular silica, 1 part by weight of diethylenetriamine and 4 parts by weight of epichlorohydrin are slowly mixed while keeping the temperature below 70° C, thereby producing a thick liquid epoxy silicate prepolymer. The epoxy silicate propolymer is heated to 80° to 100° C and forms a hard, solid resin.

EXAMPLE VI

About 2 parts by weight of fine granular magnesium silicate and 2 parts by weight of diethylenetriamine are mixed, then 3 parts by weight of epichlorohydrin are slowly added while agitating and keeping the temperature below 70° C until all the epichlorohydrin has been added; then let the temperature rise to 80° to 100° C and the mixture expands to 6 to 8 times its original volume, thereby producing a dark brown semi-rigid, epoxy silicate foam.

EXAMPLE VII 3 parts by weight of epichlorohydrin are slowly added to 2.5 parts by weight of 1,6-hexanediamine while agitating at ambient pressure and keeping the temperature below 70° C. About 2 parts by weight of fine granular silica are added and mixed then heated while agitating at ambient pressure to 80° to 100° C, and the mixture begins to expand to 4 to 6 times its original volume, thereby producing an epoxy silicate foam, semi-rigid and light gray in color.

EXAMPLE VIII 2 parts by weight of diethylenetriamine, 1 part by weight of sodium hydroxide flakes and 1 part by weight of fine granular silica are mixed, then 3 parts by weight of epichlorohydrin are added slowly while agitating at ambient pressure while keeping the temperature between ambient temperature and 70° C over a period of 10 to 30 minutes, thereby producing an epoxy silicate propolymer. The epoxy silicate prepolymer is then heated to 80° to 100° C while agitating for a few minutes until foaming begins. The foam expands to about 6 to 8 times its original volume, thereby producing a soft, cream colored epoxy silicate foam.

EXAMPLE IX

Production of epoxy silicate foam by using 2 separate mixtures:
- A. One part by weight of sodium hydroxide flakes, 2 parts by weight of water, 2 parts by weight of 1,6-hexanediamine and 2 parts by weight of epichlorohydrin are mixed then heated to about 70° C for 10 to 30 minutes, thereby producing a thick gray epoxy prepolymer.
- B. 2 parts by weight of ethylenediamine and 2 parts by weight of fine granular silica are mixed, then 3 parts by weight of epichlorohydrin are slowly added while agitating at ambient pressure while keeping the temperature below 70° C, thereby producing an epoxy silicate prepolymer.

The epoxy prepolymer and the epoxy silicate prepolymer of parts A and B are mixed, then a foam regulator, in the amount of 0.01 parts by weight of sodium dioctyl sulfosuccinate, are mixed in and then heated to 80° to 100° C while agitating until the mixture begins to expand. It expands to about 6 to 8 times the original volume, thereby producing a gray, semi-rigid epoxy silicate foam.

EXAMPLE X 2 parts by weight of fine granules of clay, 3 parts by weight of 1,6-hexanediamine and 3 parts by weight of epichlorohydrin are mixed then agitated at ambient pressure while keeping the temperature between 25° to 70° C for 10 to 30 minutes, thereby producing an epoxy silicate propolymer. The epoxy silicate prepolymer is then heated to 80° to 100° C while agitating until it begins to expand. It expands to about 5 to 8 times its original volume, thereby producing light gray, soft epoxy silicate foam.

EXAMPLE XI

Production of epoxy silicate foam by using 2 separate mixtures:
- A. 2 parts by weight of epichlorohydrin and 0.25 parts by weight of concentrated phosphoric acid are mixed. The mixture is agitated for 10 to 20 minutes, thereby producing polyepichlorohydrin polymer. About 1 part by weight of sodium hydroxide flakes is added to the mixture and heated to just above the melting point of sodium hydroxide flakes, thereby producing a tan polyepichlorohydrin polymer.
- B. About 2 parts by weight of ethylenediamine and 2 parts by weight of fine granular silica are mixed, then 3 parts by weight of epichlorohydrin are slowly added while agitating at ambient pressure while keeping the temperature below 70° C, thereby producing an epoxy silicate prepolymer.

The tan polyepichlorohydrin produced in B are mixed then agitated while heating to 80° to 100° C until the mixture expands to 5 to 8 times its original volume and then is heated in an oven at 80° to 120° C for 1 to 2 hours, thereby producing a semi-rigid, light gray colored, tough epoxy silicate foam.

EXAMPLE XII 2 parts by weight of diethylenetriamine, 1 part by weight of fine granular hydrated silica, 1 part by weight of fine granular silica, and 4 parts by weight of diglycedyl ether of bisphenol epoxy resin containing 2 or more reactive epoxy groups per molecule are mixed then heated to 80° to 100° C while agitating at ambient pressure for 3 to 10 minutes until the mixture begins to expand, thereby producing a cream colored, rigid epoxy silicate foam.

EXAMPLE XIII 2 parts by weight of diethylenetriamine, 4 parts by weight of bisphenol A epoxy resin with 2 or more reactive epoxy groups per molecule and 2 parts by weight of fine granular talc powder are mixed then heated to 80° to 100° C while agitating for 3 to 10 minutes until the mixture begins to expand, thereby producing a cream colored, rigid epoxy silicate foam which has expanded 5 to 8 times its original liquid volume. The foam may be used to strengthen hollow objects and for insulation.

EXAMPLE XIV 2 parts by weight of triethylenetetramine, 3 parts by weight of epichlorohydrin, 2 parts by weight of a fine granular silicoformic acid and hydrated silica mixture, and epoxidized castor oil containing 2 or more reactive epoxy groups per molecule are slowly mixed and then agitated for 10 to 20 minutes while keeping the temperature between 25° to 70° C. The mixture is then heated to 80° to 100° C while agitating for 3 to 10 minutes until the mixture begins to expand, thereby producing a cream colored, soft, tough epoxy silicate foam.

EXAMPLE XV

About 1 part by weight of diethylenetriamine, 1 part by weight of caprolactam, 2 parts by weight of a fine granular silica, 1 part by weight of sodium polysulfide, and 1 part by weight of 1,2-epoxypropane are mixed; then 2 parts by weight of epichlorohydrin are slowly added while agitating for 10 to 20 minutes, at ambient pressure, thereby producing an epoxy silicate prepolymer. The epoxy silicate prepolymer is then poured into a mold then heated to 80° to 100° C while agitating for 3 to 10 minutes until the mixture begins to expand, thereby producing a soft, rubbery, light yellow colored, epoxy silicate foam which has expanded 6 to 8 times its original liquid volume.

EXAMPLE XVI

About 1 part by weight of sodium hydroxide flakes and about 1 part by weight of sulfur are mixed then heated to above the melting temperature of sulfur while agitating for 10 to 20 minutes. To the above mixture is added 2 parts by weight of a fine granular silica, and 2 parts by weight of an amino-terminated polymerized oil resin; then 4 parts by weight of epichlorohydrin are slowly added while agitating at ambient pressure for 10 to 20 minutes while keeping the temperature between 25° to 70° C. The mixture is then heated to 80° to 100° C while agitating for 3 to 10 minutes until the mixture begins to expand, thereby producing a light yellow, rubbery, soft epoxy silicate foam.

EXAMPLE XVII

About 2 parts by weight of a fine granular silica, 2 parts by weight of ethylenediamine and 1 part by weight of sodium hydroxide flakes are mixed then heated to just below the boiling temperature of ethylenediamine for 20 to 40 minutes at ambient pressure, thereby producing an aminosilicate compound. Then 2 parts by weight of an epoxidized unsaturated fatty acid containing 2 or more active epoxy groups per molecule and 3 parts by weight of epichlorohydrin are slowly mixed with the aminosilicate compound and agitated at ambient pressure for 10 to 20 minutes while keeping the temperature between 25° to 70° C, thereby producing an epoxy silicate prepolymer. The epoxy silicate prepolymer is then heated while agitating to a temperature of 80° to 100° C until the mixture begins to expand; it expands 6 to 10 times its original volume, thereby producing a cream colored, soft, epoxy silicate foam.

EXAMPLE XVIII

About 2 parts by weight of fine granular silica, 2 parts by weight of diethylenetriamine, 2 parts by weight of allyl chloride, and 1 part by weight of potassium hydroxide are mixed; then about 3 parts by weight of epichlorohydrin are slowly added while agitating and keeping the temperature between 25° to 70° C for 10 to 20 minutes at ambient pressure, thereby producing an epoxy silicate prepolymer. The epoxy silicate prepolymer is then heated to 80° to 100° C while agitating until the mixture begins to expand; it expands 6 to 10 times its original volume, thereby producing a soft, rubbery, cream colored epoxy silicate foam.

EXAMPLE XIX

About 1.5 parts by weight of fine granular diatomaceous earth, 2 parts by weight of sulfate lignin as produced by the Kraft process (soda process) and 2 parts by weight of ethylenediamine are mixed; then 3 parts by weight of epichlorohydrin are slowly added while agitating at ambient pressure and keeping the temperature between 25° to 70° C for 10 to 20 minutes until the reaction is substantially complete, thereby producing an epoxy silicate prepolymer. The epoxy silicate prepolymer is then heated to 80° to 100° C while agitating until the mixture begins to expand. The mixture expands 6 to 10 times its original volume thereby producing a brown, soft, epoxy silicate foam.

This epoxy silicate foam may be utilized for insulation and for the protection of fragile products in shipping.

EXAMPLE XX

About 3 parts by weight of fine granular pectolin, 1 part by weight of sodium salt of sulfite lignin, 1 parts by weight of calcium sulfite lignin and 2 parts by weight of diethylenetriamine are mixed; then 4 parts by weight of epichlorohydrin are slowly added while agitating and keeping the temperature between 25° to 70° C for 10 to 20 minutes, thereby producing an epoxy silicate prepolymer. The epoxy silicate prepolymer is poured into a mold then heated to 80° to 100° C while agitating until the mixture begins to expand, thereby producing a brown, soft, epoxy silicate foam.

EXAMPLE XXI

About 2 parts by weight of fine granular hydrated silica, 2 parts by weight of a liquid (300 to 1500 poises) polyester resin (produced by chemically reacting 15 mols of diethylene glycol and 1 mol of trimethylol propane with 15 mols of adipic acid) and 2 parts by weight of diethylenetriamine are mixed; then 3 parts by weight of epichlorohydrin are slowly added while agitating for 10 to 20 minutes at ambient pressure and keeping the temperature between 25° to 70° C, thereby producing a light gray, thick liquid, epoxy silicate prepolymer. The epoxy silicate prepolymer is poured into a mold then heated to 80° to 100° C while agitating until the mixture begins to expand, thereby producing a soft, cream colored, rubbery epoxy silicate foam. The foam is then heated at 100° to 150° C for 1 to 2 hours.

EXAMPLE XXII

About 2 parts by weight of fine granular silica, 2 parts by weight of a liquid (300 to 1500 poises) polyester containing 4 mols of glycerol, 3 mols of adipic acid and 0.5 mols of phthalic anhydride, and 2 parts by weight of diethylenetriamine are mixed; then 3.5 parts by weight of epichlorohydrin are slowly added while agitating and keeping the temperature between 25° to 70° C for 10 to 20 minutes, thereby producing a thick, light gray, liquid, epoxy silicate prepolymer. About 0.01 parts by weight of dioctyl sulfosuccinate are mixed in the epoxy silicate propolymer and is then heated to 80° to 100° C while agitating for a few minutes until the mixture begins to expand. The mixture expands 6 to 10 times its original volume, thereby producing a cream colored, semirigid, epoxy silicate foam. The foam is then heated to 100° to 150° C for 1 to 2 hours.

EXAMPLE XXIII

About 2 parts by weight of fine granular silica, 1.5 parts by weight of a polyester resin (containing 1 mol of phthalic anhydride, 3 mols of maleic anhydride, 4 mols of ethylene glycol and 2 mols of styrene), 1 part by weight of ethylenediamine and 1 part by weight of 1,6-hexanediamine are mixed; then 4 parts by weight of epichlorohydrin are slowly added while agitating and keeping the temperature between 25° to 70° C for 10 to 20 minutes, thereby producing a thick, light gray, liquid, epoxy silicate prepolymer. The epoxy silicate prepolymer is then poured into a mold then heated to 80° to 100° C while agitating; in 3 to 5 minutes the mixture begins to expand; the agitating is stopped and the mixture expands to 6 to 10 times its original volume, thereby producing a cream colored, soft, epoxy silicate foam. The foam is then heated to 100° C to 150° C for 1 to 2 hours.

EXAMPLE XXIV 2 parts by weight of a fine granular silica, 2 parts by weight of diethylenetriamine, 1 to 2 parts by weight of polyethylene glycol (200 to 500 molecular weight), 1 part by weight of sodium hydroxide flakes are mixed; then 3 parts by weight of epichlorohydrin are slowly added while agitating and keeping the temperature between 25° to 70° C for 10 to 20 minutes at ambient pressure, thereby producing an epoxy silicate prepolymer. The epoxy silicate prepolymer is then heated to 80° to 100° C while agitating until the mixture expands. The mixture expands 6 to 8 times its original volume, thereby producing a soft, cream colored, epoxy silicate foam.

EXAMPLE XXV

About 0.5 parts by weight of fine granular silica, 3 parts by weight of 1,6-hexanediamine, 2 parts by weight of epichlorohydrin, 2 parts by weight of 1:2,3:4-diepoxybutane, 1 part by weight of sodium hydroxide flakes and 1 to 2 parts by weight of castor oil are mixed then agitated while keeping the temperature between 25° to 70° C for 10 to 20 minutes. The temperature is then raised to 80° to 100° C for 3 to 5 minutes, and the mixture expands 6 to 10 times its original volume, thereby producing a cream colored semirigid epoxy silicate foam.

EXAMPLE XXVI

Epoxy silicate foam is produced by the following steps:
(a) 3 parts by weight of a fine granular silica, 2 parts by weight of diethylenetriamine, and 1 part by weight of maleic anhydride are mixed; then 3 parts by weight of epichlorohydrin are slowly added while agitating and keeping the temperature between 25° to 70° C for 10 to 20 minutes, thereby producing an epoxy silicate prepolymer;
(b) 1 to 2 parts by weight of toluene diisocyanate (80% 2,4 and 20% 2,6) and 2 parts by weight of epichlorohydrin are mixed then added slowly to the epoxy silicate prepolymer produced in part (a) while agitating and keeping the temperature between 25° to 70° C for 10 to 20 minutes; the temperature is then increased to 80° to 100° C until the mixture begins to expand, thereby producing a tan colored, semirigid epoxy silicate foam that has expanded to 6 to 10 times its original volume.

EXAMPLE XXVII

About 1 to 2 parts by weight of unsaturated fatty acid, 0.5 parts by weight of sodium hydroxide flakes and 1 part by weight of epichlorohydrin are mixed then heated to just below the boiling temperature of epichlorohydrin for about 30 minutes. About 2 parts by weight of fine granular silica and 2 parts by weight of ethylenediamine are added to the mixture; then 3 parts by weight of epichlorohydrin are slowly added while agitating for 10 to 20 minutes while keeping the temperature between 25° and 70° C, thereby producing a light gray colored epoxy silicate prepolymer. The epoxy silicate prepolymer is then heated to 80° to 100° C while agitating until the mixture begins to expand. The mixture expands to 6 to 10 times its original volume to produce a cream colored soft epoxy silicate foam.

EXAMPLE XXVIII

About 1 part by weight of glycerol, 0.5 parts by weight of sodium hydroxide flakes and 1 part by weight of epichlorohydrin are mixed then heated to just below the boiling temperature of epichlorohydrin while agitating for about 30 minutes. 2 parts by weight of diethylenetriamine and 2 parts by weight of fine granular silica are added and mixed with the epoxidized glycerol; then 3 parts by weight of epichlorohydrin are slowly added while agitating for 10 to 20 minutes and keeping the temperature between 25° to 70° C, thereby producing an epoxy silicate prepolymer. The epoxy silicate prepolymer is then heated to 80° to 100° C while agitating for 3 to 10 minutes until the mixture begins to expand. The mixture expands to 6 to 10 times its original volume, thereby producing an epoxy silicate foam.

Although specific conditions and ingredients have been described in conjunction with the above examples of preferred embodiments, these may be varied and other reagents and additives may be used, where suitable, as described above, with similar results.

Other modifications and applications of this invention will occur to those skilled in the art upon reading this disclosure. These are intended to be included within the scope of this invention as defined in the appended claims.

I claim:
1. The process for the production of epoxy silicate foam by the following steps:
(a) adding about 0.5 to 4 parts by weight of a fine granular oxidated silicon compound;
(b) mixing therewith a catalytic amount of an organic amine compound;
(c) mixing therewith 3 to 4 parts by weight of an organic epoxy compound having at least one epoxy group;
(d) agitating the mixture while keeping the temperature between 25° to 70° C until the resulting chemical reaction is complete, thereby
(e) producing an epoxy silicate prepolymer;
(f) heating the epoxy silicate prepolymer to a temperature of 80° to 100° C while agitating until foaming begins, thereby
(g) producing an epoxy silicate foam.
2. The process according to claim 1 wherein the oxidated silicon compound is selected from the group consisting of silicoformic acid, hydrated silica, silica, alkali metal silicates, alkaline earth metal silicates, clay, talc, zeolite, diatomaceous earth, soapstone, tremoline, feldspar, kaolin, and mixtures thereof.
3. The process according to claim 1 wherein the organic epoxy compound is selected from the group consisting of epichlorohydrin, glycidol, methyl epichlorohydrin, 1,2-epoxybutane, 1,2-epoxypropane, 1-chloro-2,3-epoxypropane, 1:2,3:4-diepoxybutane, 2:3,6:7-diepoxy-2,6-dimethyl-4-octene, epoxyethylbenzene and mixtures thereof.
4. The process according to claim 1 wherein the amine catalyst is an organic amine selected from the group consisting of primary aliphatic diamines, primary aliphatic polyamines, and primary aromatic diamines and added in the amount of 1.5 to 3 parts by weight.
5. The process according to claim 1 wherein the epoxy compound is first reacted chemically with the amine compound, thereby producing an epoxy prepolymer, and then the oxidated silicon compound is added after step (e); the mixture is then heated to 80° to 100° C while agitating until the foaming begins, thereby producing an epoxy silicate foam.
6. The process according to claim 1 wherein the organic epoxy compound is epichlorohydrin.
7. The process according to claim 1, including the further step of adding an alkali compound, selected from the group consisting of sodium hydroxide, potassium hydroxide, sodium carbonate and potassium carbonate, with the said organic amine catalyst in the proportion of 1 to 2 mols to each 2 mols of the halide present in the epoxy compound.

8. The process according to claim 1 wherein the epoxy compound is an epoxy resin, containing 2 or more reactive epoxy groups per molecule.

9. The process according to claim 8 wherein the epoxy resin is produced by reacting epichlorohydrin with a di(mono-hydroxy) alkane to produce an epoxy resin containing 2 or more reactive epoxy groups per molecule.

10. The process according to claim 1 wherein the epoxy compound is a mixture of epichlorohydrin and an epoxidized unsaturated vegetable oil in the ratio of 1 part by weight of epichlorohydrin to 0.5 to 2 parts by weight of epoxidized unsaturated vegetable oil.

11. The process according to claim 1 wherein the epoxy compound is a mixture of epichlorohydrin and an epoxidized unsaturated fatty acid, in the ratio of 1 part by weight of epichlorohydrin to 0.5 to 2 parts by weight of the epoxidized unsaturated fatty acid.

12. The process according to claim 1 wherein the epoxy compound is epichlorohydrin and an epoxidized polyhydroxy compound in the ratio of 1 part by weight of the epichlorohydrin to 0.5 to 2 parts by weight of the epoxidized polyhydroxy compound.

13. The process according to claim 1 wherein the epoxy compound is epichlorohydrin and an epoxidized olefin compound in the ratio of 1 part by weight of the epichlorohydrin to 0.5 to 2 parts by weight of the epoxidized olefin compound.

14. The process according to claim 1 wherein the amine catalyst is replaced with a polyamide catalyst and contains 2 or more reactive amine groups per molecule.

15. The product produced by the process of claim 1.

16. The process according to claim (a) of claim 1 wherein an additional step is added before step 1, wherein sodium hydroxide is first mixed with an equal amount of sulfur, then heated to just above the melting point of sulfur while agitating for 10 to 20 minutes and then added in the amount of 0.5 to 1 mol of the sodium hydroxide to one mol of the halide contained in the epoxy compound in step 1.

17. The process according to claim 1 wherein a lignin compound, selected from the group consisting of sulfite lignin, sulfate lignin produced by the soda process (Kraft process), lignin produced by the soda process, sodium salt of sulfite lignin, calcium sulfite lignin, partially desulfonated sulfite lignin and mixtures thereof, is added in step (a) of claim 1 in the amount of 1 to 2 parts by weight.

18. The process according to claim 1 wherein 1 to 2 parts by weight of a polyester resin is added in step (a) of claim 1.

19. The process according to claim 1 wherein 1 to 2 parts by weight of a polyether glycol is added in step (a) of claim 1.

20. The process according to claim 1 wherein 1 to 2 parts by weight of a vegetable oil is added in step (a) of claim 1.

21. The process according to claim 1 wherein 1 to 2 parts by weight of an isocyanate, selected from the group consisting of toluene-2,4-diisocyanate; toluene-2,6-diisocyanate; diphenylmethane-2,4 diisocyanate; meta-phenylene diisocyanate; triphenylmethane triisocyanate; hexamethylene diisocyanate; dianisidine diisocyanate; xenylene diisocyanate; dichloroxenylene diisocyanate; naphthalene-1,5-diisocyanate; diphenyl sulfone-1,4-diisocyanate; 2-nitrodiphenyl-4,4'-diisocyanate; fluorene diisocyanate; 3,3'-dimethyldiphenylmethane-4,4'-diisocyanate; and mixtures thereof are added in step (d).

22. The process according to claim 1 wherein 1 to 2 parts by weight of allyl chloride are added in step (a) of claim 1.

23. The process according to claim 21 wherein the isocyanate is toluene diisocyanate (80% 2,4-isomer and 20% 2,6-isomer).

24. The process according to claim 1 wherein 1 to 2 parts by weight of a polyepichlorohydrin polymer is added in step (a) of claim 1.

* * * * *